United States Patent
Tamai et al.

(10) Patent No.: US 9,482,288 B2
(45) Date of Patent: Nov. 1, 2016

(54) CLUTCH SYSTEM FOR A TRANSMISSION

(71) Applicants: Goro Tamai, Bloomfield Hills, MI (US); Dumitru Puiu, Sterling Heights, MI (US); Dale E Martin, Novi, MI (US)

(72) Inventors: Goro Tamai, Bloomfield Hills, MI (US); Dumitru Puiu, Sterling Heights, MI (US); Dale E Martin, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 94 days.

(21) Appl. No.: 14/608,318

(22) Filed: Jan. 29, 2015

(65) Prior Publication Data
US 2015/0136558 A1 May 21, 2015

Related U.S. Application Data

(62) Division of application No. 13/188,799, filed on Jul. 22, 2011, now Pat. No. 8,961,343.

(51) Int. Cl.
| | |
|---|---|
| *F16H 3/72* | (2006.01) |
| *F16D 13/75* | (2006.01) |
| *B60K 6/365* | (2007.10) |
| *B60K 6/445* | (2007.10) |
| *F16D 13/70* | (2006.01) |
| *F16H 37/08* | (2006.01) |

(52) U.S. Cl.
CPC ............ *F16D 13/757* (2013.01); *B60K 6/365* (2013.01); *B60K 6/445* (2013.01); *F16D 13/70* (2013.01); *F16H 3/728* (2013.01); *F16H 2037/0873* (2013.01); *F16H 2200/2007* (2013.01); *F16H 2200/2035* (2013.01); *Y02T 10/6239* (2013.01)

(58) Field of Classification Search
CPC .............................. F16D 13/757; F16H 3/728
See application file for complete search history.

(56) References Cited

U.S. PATENT DOCUMENTS

| | | |
|---|---|---|
| 2004/0254039 A1 | 12/2004 | Yasui et al. |
| 2006/0019785 A1 | 1/2006 | Holmes et al. |
| 2007/0072725 A1 | 3/2007 | Bucknor et al. |
| 2007/0225097 A1 | 9/2007 | Raghavan et al. |
| 2007/0275814 A1 | 11/2007 | Bucknor |

OTHER PUBLICATIONS

International Search Report dated Dec. 5, 2012 for International Application No. PCT/US2012/047526, International Filing Date Jul. 20, 2012.
Written Opinion dated Dec. 5, 2012 for International Application No. PCT/US2012/047526, International Filing Date Jul. 20, 2012.

*Primary Examiner* — Derek D Knight
(74) *Attorney, Agent, or Firm* — Ralph E Smith

(57) ABSTRACT

A clutch system for a transmission having a clutch assembly and a brake assembly. The clutch system includes a clutch assembly and a brake assembly coupled to a planetary gear set, engine and two electric motors to reduce transmission complexity, costs, and efficiency losses. The clutch assembly also includes a wear compensation mechanism and a clutch separator mechanism.

5 Claims, 4 Drawing Sheets

| INPUT RATIO | BRAKE | C1 |
|---|---|---|
| UNDERDRIVE | ON | OFF |
| UNITY | OFF | ON |
| GROUND | ON | ON |

FIG. 2

CLUTCH SYSTEM FOR A TRANSMISSION

CROSS REFERENCE TO RELATED APPLICATION

This is a divisional application of U.S. Ser. No. 13/188,799, filed Jul. 22, 2011.

FIELD

The present disclosure relates to a clutch system for a transmission, and more particularly to a clutch system for a transmission having a clutch assembly and a brake assembly.

BACKGROUND

Some current hybrid transmissions feature two electric motors coupled to an internal combustion engine by dual clutches and include gear sets coupled to the clutches and electric motors. Typical prior art transmissions arrange the electric motors, clutches and gear sets such that the actual torque applied by the electric motors and elsewhere within the transmission is significantly amplified at the transmission clutches. This higher torque requires larger, more durable clutches to be fitted into the transmission, increasing size, weight, and cost. Because typical prior art transmissions amplify the torque applied at the clutches, larger, more powerful electric motors are needed to provide enough torque to start an engine coupled to the transmission. Larger motors increase the cost and size of the transmission and create additional packaging difficulties. Thus, there remains a need for improvement in hybrid electrically variable transmissions.

Some typical prior art transmissions utilize two clutches coupled to the electric motors and gears within the transmission. Each clutch typically requires a dedicated bearing, increasing friction losses within the transmission and increasing costs. Thus, there remains a need for improvement in hybrid electrically variable transmissions.

In many typical prior art transmissions, a clutch disk is forced under pressure into contact with a friction plate to transfer power from a first set of components to a second set of components. The applied pressure is relieved when power is no longer to be transferred. However, the clutch disk and friction plate are still left to gently rub against one another causing friction losses, vibration, and wear. What is needed, therefore, is a clutch separator mechanism to prevent contact between the clutch disk and friction plate when the clutch assembly is deactivated. As the clutch disk and friction plate wear in typical prior art transmissions, the distance between the clutch disk and friction plate increases when in the deactivated state. As a result, greater movement and time is needed to fully activate the clutch assembly. In some circumstances, the clutch assembly may not be capable of sufficient movement to fully activate the clutch. Thus, there remains a need for improvement in hybrid electrically variable transmissions.

SUMMARY

In one form, the present disclosure provides a hybrid transmission including a clutch assembly, brake assembly, and input planetary gear set. The hybrid transmission also includes a first input shaft coupled to the input planetary gear set, and a second input shaft coupled to the brake assembly, clutch assembly, and input planetary gear set.

In another form, the present disclosure provides a transmission including a transmission input shaft, brake assembly, clutch assembly, and input planetary gear set. The transmission also includes a first input shaft coupled to the input planetary gear set and the transmission input shaft, and a second input shaft coupled to the brake assembly, the clutch assembly, and the input planetary gear set. The transmission also includes a first electric motor, first electric motor gear set coupled to the first electric motor, second electric motor, second electric motor gear set coupled to the second electric motor, output gear set, and output shaft coupled to the output gear set. The clutch assembly selectively couples the second input shaft to the transmission input shaft and the brake assembly selectively couples the second input shaft to a transmission housing. The second electric motor gear set is coupled to the input planetary gear set, and the first electric motor gear set and the second electric motor gear set are coupled to the output gear set.

In yet another form, the present disclosure provides a clutch separator mechanism including a first clutch assembly having a first clutch disk and a first friction plate. The clutch separator mechanism also includes a first separator spring and a first pair of snap rings. A first snap ring of the first pair of snap rings is disposed between the first clutch disk and the first friction plate, and a second snap ring of the first pair of snap rings is disposed on the opposite side of the first friction plate. The first separator spring is disposed between the first clutch disk and the first snap ring of the first pair of snap rings, and applies a force to the first clutch disk to move the first clutch disk away from the first friction plate. The second snap ring of the first pair of snap rings permits the first clutch disk to move a limited, predefined distance away from the first friction plate.

In yet another form, the present disclosure provides a clutch wear compensation mechanism including a clutch assembly having a spline shaft, a clutch disk mounted upon the spline shaft, and a friction plate. The clutch wear compensation mechanism also includes a separator spring, and a pressed ring. The pressed ring is disposed along an inner circumference of the spline shaft and is configured to be disposed in a radial groove perpendicular to the longitudinal axis of an input shaft. The separator spring is disposed between the clutch disk and the friction plate and applies a force to the clutch disk to move the clutch disk away from the friction plate. The pressed ring is movable with respect to the spline shaft in a first direction but not in a second direction.

Further areas of applicability of the present disclosure will become apparent from the detailed description provided hereinafter. It should be understood that the detailed description, including disclosed embodiments, drawings and claims are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 2 is a table showing exemplary operating modes of the clutch system for the transmission of FIG. 1;

DETAILED DESCRIPTION

Figure 1:
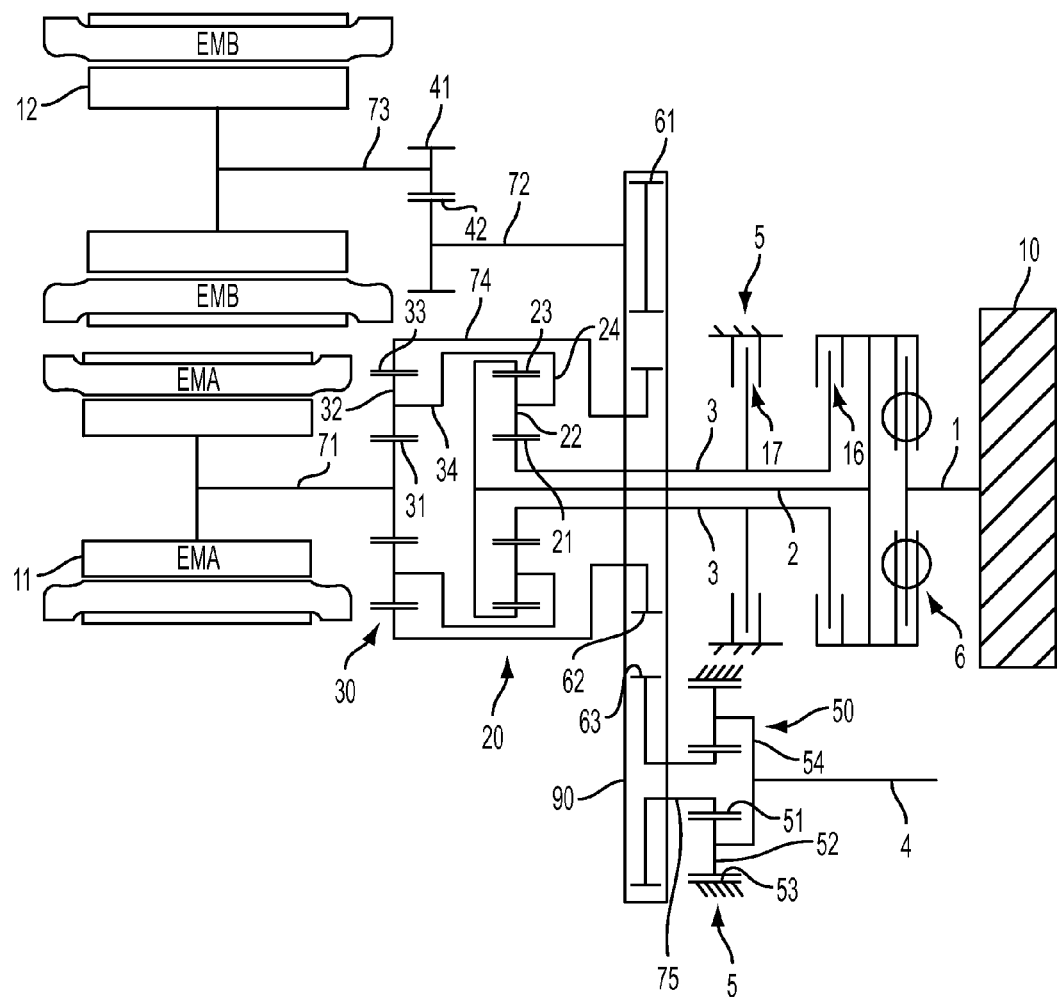
FIG. 1 is a schematic representation of an exemplary clutch system for a transmission according to the principles of the present disclosure.

FIG. 1 illustrates an example schematic representation of a clutch system for a transmission in accordance with a desired embodiment. An engine 10 is coupled to a transmission input shaft 1. The engine 10 may be any type of internal combustion engine or any other power source desired. The transmission input shaft 1 is coupled by a damper 6 to a first clutch assembly 16 and also to a first input shaft 2. The first clutch assembly 16 selectively couples the transmission input shaft 1 to a second input shaft 3. The second input shaft 3 is coupled to a brake assembly 17. The brake assembly 17 selectively couples the second input shaft 3 and, thereby, all components coupled to it to the transmission housing 5.

The first input shaft 2 is also coupled to an input ring gear 23 of an input planetary gear set 20. The second input shaft 3 is also coupled to an input sun gear 21 of the input planetary gear set 20. Input pinion gears 22 of the input planetary gear set 20 are rotatably mounted on an input carrier 24 of the input planetary gear set 20. The input pinion gears 22 are continuously meshed with the input sun gear 21 and the input ring gear 23. The input carrier 24 is coupled to an EMA carrier 34 of an EMA planetary gear set 30. EMA pinion gears 32 of the EMA planetary gear set 30 are rotatably mounted on the EMA carrier 34. The EMA pinion gears 32 are continuously meshed with an EMA sun gear 31 and EMA ring gear 33 of the EMA planetary gear set 30. The EMA sun gear 31 is coupled by a shaft 71 to a first electric motor 11 ("EMA 11"). The EMA ring gear 33 is coupled by a shaft 74 to a second output driver gear 62.

A second electric motor 12 ("EMB 12") is coupled by a shaft 73 to an EMB driver gear 41 that is continuously meshed with an EMB driven gear 42. The EMB driven gear 42 is coupled by a shaft 72 to a first output driver gear 61. The first output driver gear 61 and second output driver gear 62 are coupled to an output driven gear 63 by a chain 90. In one embodiment, the chain 90 may be a belt or any other connecting mechanism. In one embodiment, the first output driver gear 61, second output driver gear 62, and output driven gear 63 may be continuously meshed.

The output driven gear 63 is coupled by a shaft 75 to an output sun gear 51 of an output planetary gear set 50. The output sun gear 51 is continuously meshed with output pinion gears 52 of the output planetary gear set 50. The output pinion gears 52 are rotatably mounted on an output carrier 54 of the output planetary gear set 50. The output pinion gears 52 are also continuously meshed with an output ring gear 53 of the output planetary gear set 50. The output ring gear 53 is coupled to the transmission housing 5. The output carrier 54 is coupled to an output shaft 4 of the transmission.

In one embodiment, the output shaft 4 may be coupled directly to the output driven gear 63 or any desired output gearing arrangement may be utilized. In one embodiment, the second electric motor 12 may be coupled directly to the first output driver gear 61 or any desired intermediate gearing arrangement may be utilized. Likewise, the gearing arrangements within the transmission may be modified as however desired within the transmission.

FIG. 2 is a table showing exemplary operating modes of the clutch system for the transmission of FIG. 1. The clutch system may be operated to provide the transmission with an underdrive input gear ratio ("underdrive"), a one-to-one input gear ratio ("unity"), or to utilize an input brake ("ground"). "On" indicates that the clutch or brake has been activated, thereby, coupling together all components to which it is attached. "Off" indicates that the clutch or brake has been deactivated, thereby, allowing the components to which it is coupled to rotate independently of one another. With reference to FIG. 1, when the transmission is to be operated with an underdrive input gear ratio, the brake assembly 17 ("Brake") is activated while the first clutch assembly 16 ("C1") is deactivated. Thus, the second input shaft 3 is coupled to the transmission housing 5 by the brake assembly 17, preventing the input sun gear 21 from rotating. Because the first clutch assembly 16 is deactivated, the first input shaft 2 rotates freely of the second input shaft 3. The arrangement of the input planetary gear set 20 causes the input carrier 24 to achieve fewer rotations per minute (RPM) than the input shaft 1.

When the transmission is to be operated with a one-to-one gear ratio, the first clutch assembly 16 is activated while the brake assembly 17 is deactivated. Thus, the first input shaft 2 and the second input shaft 3 are coupled together by the first clutch assembly 16 and rotate at the same angular velocity. Because the brake assembly 17 is deactivated, the first input shaft 2 and second input shaft 3 are free to rotate. The arrangement of the input planetary gear set 20 causes the input carrier 24 to achieve identical RPM as the input shaft 1.

When the transmission is to be operated as an input brake, the brake assembly 17 and first clutch assembly 16 are activated. Thus, the second input shaft 3 is coupled to the transmission housing 5 by the brake assembly 17 and the first input shaft 2 is coupled to the second input shaft 3 by the first clutch assembly 16. Therefore, the first input shaft 2, second input shaft 3, and input sun gear 21 are all prevented from rotating. The vehicle may be driven using EMA 11 and/or EMB 12 to provide electric powered propulsion. The activation of the brake assembly 17 and first clutch assembly 16 prevents the loss of propulsive force out the transmission input shaft 1 by preventing rotation of the transmission input shaft 1.

The torque applied to the brake assembly 17 and first clutch assembly 16 by EMA 11, EMA 12 and the engine 10 is decreased because the brake assembly 17 and first clutch assembly 16 are coupled to the sun gear 21 of the input planetary gear set 20. The reduced torque enables the use of a smaller brake assembly 17 and smaller first clutch assembly 16, thereby, saving costs, allowing for better packaging of the transmission, and reducing the mass of the brake and clutch assembly components. In one embodiment, the torque applied to the brake assembly 17 and first clutch assembly 16 is approximately half that applied in a typical prior art transmission because the brake assembly 17 and first clutch assembly 16 are coupled to the sun gear 21 of the input planetary gear set 20, thereby, creating an underdrive ratio between the brake assembly 17 and first clutch assembly 16, and EMA 11, EMA 12 and the engine 10.

In one embodiment, the default state of the brake assembly 17 is deactivated and the default state of the first clutch assembly 16 is activated. Typically, a vehicle already in motion will be operated in the "unity" drive state of FIG. 2. For example, a vehicle already in motion travelling around town or travelling on the highway will most likely be in the "unity" state of operation. The default state of a clutch does not require any hydraulic pressure to maintain the state. Thus, because the default state of the brake assembly 17 is deactivated and the default state of the first clutch assembly 16 is activated, no hydraulic pressure is required to operate the transmission in the "unity" mode of operation. As "unity" is likely the most frequent mode of operation, hydraulic pressure for activating the brake assembly 17 or first clutch assembly 16 will be reduced. Reducing the necessity for hydraulic pressure improves the efficiency of the transmission. Also, the torque required by the electric motors EMA 11, EMB 12 to start the engine 10 is greatly reduced when the transmission is operated in the "unity" mode compared with the "underdrive" mode. Therefore, setting the default mode of the transmission to the "unity" mode requires less battery power to start the engine 10 using the electric motors EMA 11, EMB 12, thereby, reducing costs and improving packaging.

Figure 3:
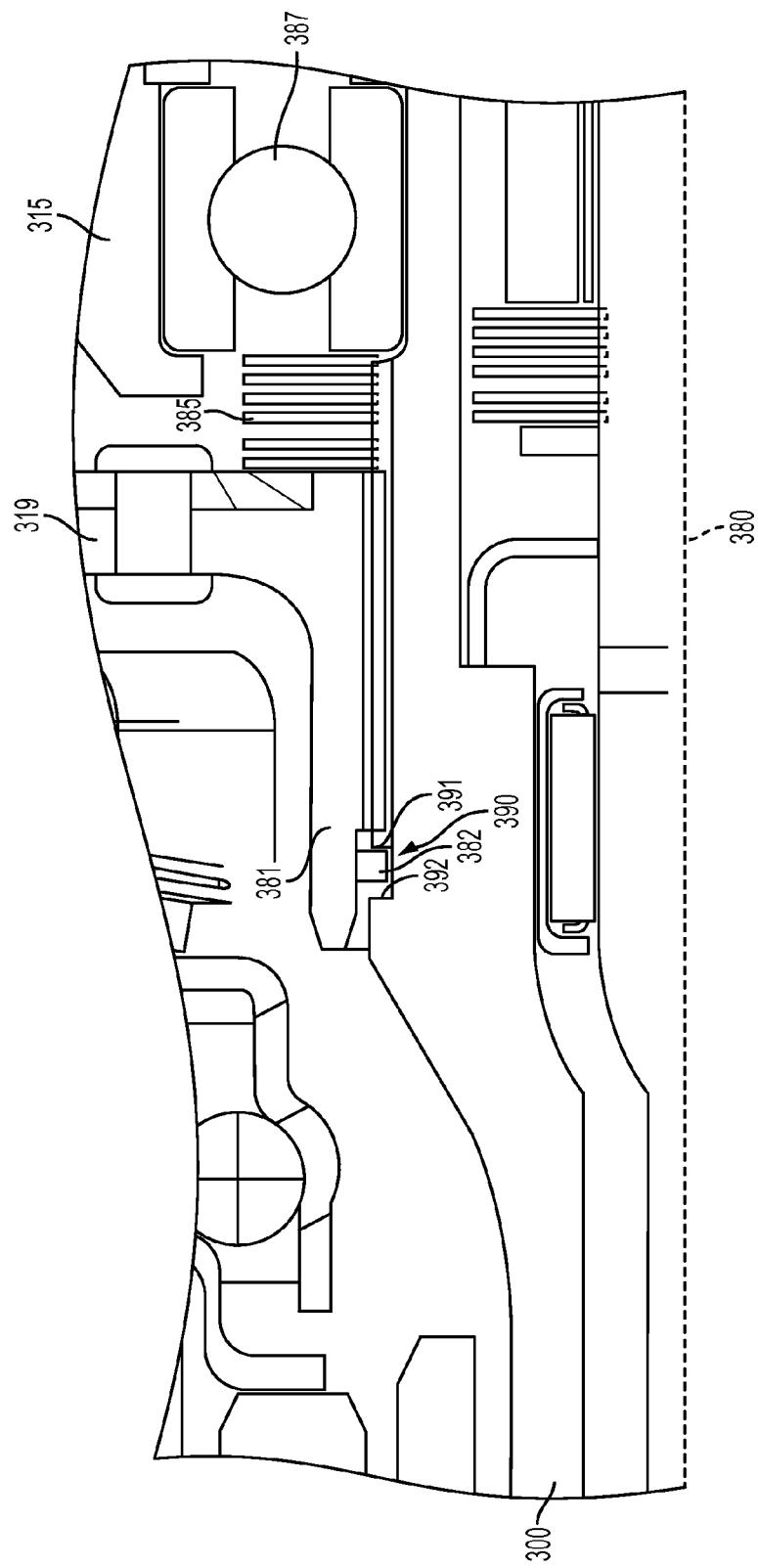
FIG. 3 is a schematic representation of an exemplary clutch separator mechanism and exemplary clutch wear compensation mechanism according to the principles of the present disclosure.

FIG. 3 is a schematic representation of an exemplary clutch separator mechanism and exemplary clutch wear compensation mechanism according to the principles of the present disclosure. A clutch disk 319 is coupled to a spline shaft 381. The spline shaft 381 is non-rotatably mounted upon an input shaft 300. A pressed ring 382 is press fit into an inner diameter of the spline shaft 381. The pressed ring 382 is pressed fit into the spline shaft 381 with sufficient force that the pressed ring 382 cannot freely move with respect to the spline shaft 381. The input shaft 300 has a radial groove 390 perpendicular to the longitudinal axis of the input shaft 300. In one embodiment, the groove 390 is around the entire outer radius of the input shaft 300.

A friction plate 315 is mounted upon a bearing 387 mounted upon the input shaft 300. A separator spring 385 is disposed between the bearing 387 and the spline shaft 381. In one embodiment, the separator spring 385 may be between the clutch disk 319 and the friction plate 315. In one embodiment, the separator spring 385 may be between any components associated with the clutch disk 319 and any components associated with the friction plate 315. The separator spring 385 applies a force to the spline shaft 381 and bearing 387 to keep the clutch disk 319 and friction plate 315 physically separated. When the clutch assembly of which the clutch disk 319 is a part is activated, the clutch disk 319 is moved into contact with the friction plate 315 and the force of the separator spring 385 is overcome. The separator spring 385 is sufficiently strong such that when the clutch assembly including the clutch disk 319 is to be deactivated, the separator spring 385 is of sufficient strength to separate the clutch disk 319 and the friction plate 315.

The groove 390 of the input shaft includes a first groove surface 391 and a second groove surface 392. The pressed ring 382 of the spline shaft 381 is located in the groove 390. In one embodiment, the width of the groove 390 along the longitudinal axis of the input shaft 300 is approximately 0.8 to 1.0 mm wider than the width of the pressed ring 382. The pressed ring 382 is forced into contact with the second groove surface 392 by the separator spring 385 when the clutch assembly is deactivated. Activation of the clutch mechanism causes the spline shaft 381 and clutch disk 319 to move towards the friction plate 315 as the application force of the clutch assembly overcomes the force exerted by the separator spring 385. As the spline shaft 381 moves towards the friction plate 315, the pressed ring 382 leaves contact with the second groove surface 392 and moves towards the friction plate 315 synchronously with the spline shaft 381. Eventually, the pressed ring 382 will contact the first groove surface 391 and be unable to move any further towards the friction plate 315. However, the spline shaft 381 must continue to move towards the friction plate 315 until the friction plate 315 is in contact with the clutch disk 319. The application force of the clutch assembly is sufficient such that the application force causes the spline shaft 381 to slide with respect to the pressed ring 382. The spline shaft 381 continues to slide with respect to the pressed ring 382 until the friction plate 315 is in contact with the clutch disk 319.

Once the clutch assembly is deactivated, the separator spring 385 forces the spline shaft 381 to move away from the friction plate 315, thereby, creating a gap between the friction plate 315 and the clutch disk 319. The pressed ring 382 moves synchronously with the spline shaft 381 away from the friction plate 315. Eventually, as the spline shaft 381 and pressed ring 382 continue to move away from the friction plate 315, the pressed ring 382 will once again contact the second groove surface 392. The force of the separator spring 385 is insufficient to move the pressed ring 382 with respect to the spline shaft 381. Therefore, the spline shaft 381 is unable to move any further away from the friction plate 315. In this manner, wear of the friction plate 315 and clutch disk 319 is compensated for by movement of the pressed ring 382 with respect to the spline shaft 381. In one embodiment, the pressed ring 382 may be held in place in a first direction with respect to the spline shaft 381 by detents or other mechanisms. In one embodiment, the pressed ring 382 need not be a complete ring around the input shaft 300. In one embodiment, the pressed ring 382 may simply be a mechanism that acts with respect to detents on the input shaft 300. In one embodiment, movement of the pressed ring 382 with respect to the spline shaft 381 is irreversible.

Figure 4:
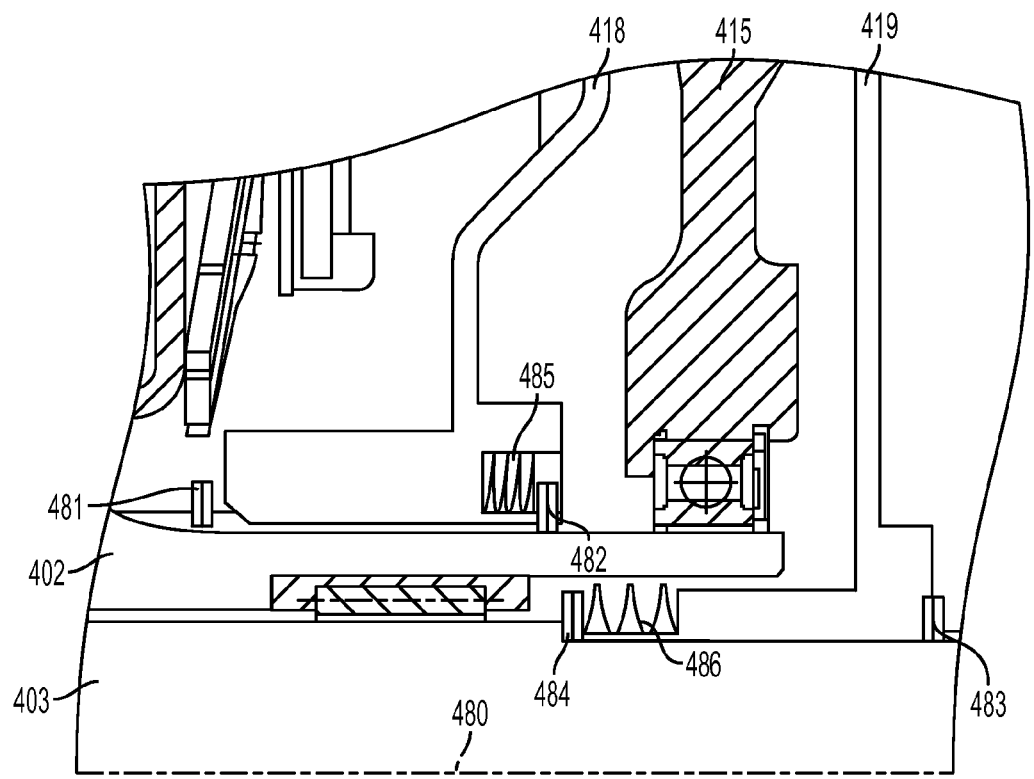
FIG. 4 is a schematic representation of another exemplary clutch separator mechanism according to the principles of the present disclosure.

FIG. 4 is a schematic representation of another exemplary clutch separator mechanism according to the principles of the present disclosure. A first clutch disk 418 is non-rotatably coupled to a first input shaft 402 and a second clutch disk 419 is non-rotatably coupled to a second input shaft 403. The first clutch disk 418 is free to move longitudinally along the first input shaft 402 and the second clutch disk 419 is free to move longitudinally along the second input shaft 403. A first pair of snap rings 481, 482 limits the amount the first clutch disk 418 may move with respect to the first input shaft 402 and a second pair of snap rings 483, 484 limits the amount the second clutch disk 419 may move with respect to the second input shaft 403. A friction plate 415 is rotatably coupled to the first input shaft 402 between the first clutch disk 418 and second clutch disk 419. In one embodiment, there may be several friction plates 415. The friction plate 415 need not be located between the first clutch disk 418 and second clutch disk 419.

A first separator spring 485 is disposed between the first clutch disk 418 and the associated snap ring 482 closest to the friction plate 415. The separator spring 485 exerts a force against the first clutch disk 418 to push the first clutch disk 418 away from the friction plate 415. The associated snap ring 481 furthest from the friction plate 415 limits the distance the first clutch disk 418 may move away from the friction plate 415. A second separator spring 486 is disposed between the second clutch disk 419 and the associated snap ring 484 closest to the friction plate 415. The separator spring 486 exerts a force against the second clutch disk 419 to push the second clutch disk 419 away from the friction plate 415. The associated snap ring 483 furthest from the friction plate 415 limits the distance the second clutch disk 418 may move away from the friction plate 415. The clutch disk 318, associated snap rings 481, 482, and separator spring 485 arrangement may be utilized in any transmission or on any occasion in which a clutch is used. In addition, any number of clutch disk 318, snap ring 483, and associated separator spring 481, 482 assemblies may be utilized.

The first clutch disk 418 is forced into contact with the associated snap ring 481 by the separator spring 485 when the first clutch assembly is deactivated, thereby, creating a gap between the first clutch disk 418 and the friction plate 415. Activation force of the first clutch assembly overcomes the strength of the separator spring 485 and forces the first clutch disk 418 to move away from the associated snap ring 481, and towards and into contact with the friction plate 415. FIG. 4 depicts the first clutch disk 418 in its activated state. Once deactivated, the separator spring 485, once again, pushes the first clutch disk 418 back into contact with the associated snap ring 481, thereby, restoring the gap between the first clutch disk 418 and the friction plate 415.

The second clutch disk 419 is forced into contact with the associated snap ring 483 by the separator spring 486 when the second clutch assembly is deactivated, thereby, creating a gap between the second clutch disk 419 and the friction plate 415. FIG. 4 depicts the second clutch disk 419 in its deactivated state. Activation force of the second clutch assembly overcomes the strength of the separator spring 486 and forces the second clutch disk 419 to move away from the associated snap ring 483, and towards and into contact with the friction plate 415. Once deactivated, the separator spring 486, once again, pushes the second clutch disk 419 back into contact with the associated snap ring 483, thereby, restoring the gap between the second clutch disk 419 and the friction plate 415. The gap between the friction plate 415 and the clutch disks 418, 419 reduces friction losses while the clutches are deactivated, thereby, increasing the overall efficiency of the transmission. Reduced clutch friction also extends the life of the clutch assemblies. In addition, in some embodiments, the clutch separator mechanism may allow for reduced tolerances in manufacturing the transmission components, thereby, reducing manufacturing costs and complexity. For example, in one embodiment, the flatness tolerance for the clutch disks 418, 419 and friction plate 415 may be reduced because of the increased gap between the components when deactivated.

In one embodiment, one clutch assembly may feature a larger diameter clutch disk and friction plate than the other clutches. For example, the first clutch assembly 16 may feature a larger diameter clutch disk and friction plate than the brake assembly 17 or vice versa. In one embodiment, the default state of the larger diameter clutch is activated, thereby, locking together the components to which it is coupled. In one embodiment, the larger diameter clutch may be the clutch that would be activated for highway cruising. In one embodiment, the larger diameter clutch may be the clutch that the activation of which establishes the lowest overall gear ratio for the transmission (i.e., the lowest ratio of output shaft 4 RPM to engine 10 RPM). Default activation of the clutch that creates the lowest overall gear ratio eliminates hydraulic pressure losses during typical vehicle cruising. Also, default activation of the largest diameter and lowest gear ratio clutch establishes favorable conditions for engine 10 cranking as the torque of the electric motors 11, 12 is amplified by the gearing and hydraulic pressure is not required to transmit the torque from the electric motors 11, 12 to the engine 10. The torque amplification allows for a reduction in the size of the batteries needed to power the electric motors 11, 12, saving costs, space, and weight. Also, because the larger diameter clutch is activated during cruising, any defects or inconsistencies in the trueness of the clutch disk or friction plate that might result in rubbing between the clutch disk and friction plate are negated since the clutch assembly is already applied. It is preferable in one embodiment that, should one clutch disk be untrue and rub the friction plate, the smaller clutch disk do so because of its lower mass and torque capacity, thereby, creating less vibrations and less friction losses.

In one embodiment, axial thrust retainer clips may be used to locate the clutch assemblies instead of dedicated thrust bearings. Eliminating bearings reduces friction losses within the transmission, thereby, improving transmission efficiency. For example, in one embodiment, because some components of the brake assembly 17 do not rotate, the brake assembly 17 may be retained with axial thrust retainer clips or by some means other than bearings. In one embodiment, a brake assembly friction plate may not rotate.

What is claimed is:

1. A clutch separator mechanism comprising:
   a first clutch assembly, comprising:
      a first clutch disk; and
      a first friction plate,
   a first separator spring; and
   a first pair of snap rings, wherein:
      a first snap ring of said first pair of snap rings is disposed between said first clutch disk and said first friction plate, and a second snap ring of said first pair of snap rings is disposed on the opposite side of said first friction plate,
      said first separator spring is disposed between said first clutch disk and said first snap ring of said first pair of snap rings,
      said first separator spring applies a force to said first clutch disk to move said first clutch disk away from said first friction plate, and
      said second snap ring of said first pair of snap rings permits said first clutch disk to move a limited, predefined distance away from said first friction plate.

2. The clutch separator mechanism of claim 1, further comprising:
   a second clutch assembly, comprising:
      a second clutch disk; and
      a second friction plate,
   a second separator spring; and
   a second pair of snap rings, wherein:
      a first snap ring of said second pair of snap rings is disposed between said second clutch disk and said second friction plate, and a second snap ring of said second pair of snap rings is disposed on the opposite side of said second friction plate,
      said second separator spring is disposed between said second clutch disk and said first snap ring of said second pair of snap rings,
      said second separator spring applies a force to said second clutch disk to move said second clutch disk away from said second friction plate,
      said second snap ring of said second pair of snap rings permits said second clutch disk to move a limited, predefined distance away from said second friction plate, and
      said first friction plate and said second friction plate are the same.

3. A clutch wear compensation mechanism comprising:
   a clutch assembly, comprising:
      a spline shaft;
      a clutch disk mounted upon said spline shaft; and a friction plate,
a separator spring; and
a pressed ring, wherein:
- said pressed ring is disposed along an inner circumference of said spline shaft,
- said pressed ring is configured to be disposed in a radial groove perpendicular to the longitudinal axis of an input shaft,
- said separator spring is disposed between said clutch disk and said friction plate and applies a force to said clutch disk to move said clutch disk away from said friction plate,
- said pressed ring is movable with respect to said spline shaft in a first direction but not in a second direction.

4. The clutch wear compensation mechanism of claim 3, wherein the application force of said clutch assembly causes said pressed ring to move with respect to said spline shaft in a first direction and the force applied by said separator spring is insufficient to move said pressed ring with respect to said spline shaft in any direction.

5. The clutch wear compensation mechanism of claim 4, wherein the pressed ring is configured to be disposed in a radial groove perpendicular to the longitudinal axis of an input shaft having a width 0.8 to 1.0 mm wider than the width of the pressed ring.

\* \* \* \* \*